United States Patent
Sadot et al.

(10) Patent No.: US 10,236,952 B1
(45) Date of Patent: Mar. 19, 2019

(54) ENERGY-EFFICIENT POWER AND OFFSET ALLOCATION OF SPATIAL MULTIPLEXING IN MULTIMODE FIBER

(71) Applicant: B.G. NEGEV TECHNOLOGIES AND APPLICATIONS LTD., AT BEN-GURION UNIVERSITY, Beer Sheva (IL)

(72) Inventors: Dan Sadot, Kfar-Bilu (IL); Nir Sheffi, Rehovot (IL)

(73) Assignee: B. G. Negev Technologies and Applications Ltd., at Ben-Gurion University, Beer Sheva (IL)

( * ) Notice: Subject to any disclaimer, the term of this patent is extended or adjusted under 35 U.S.C. 154(b) by 0 days.

(21) Appl. No.: 15/873,077

(22) Filed: Jan. 17, 2018

(51) Int. Cl.
*H04B 7/06* (2006.01)
*H04B 7/0426* (2017.01)
(Continued)

(52) U.S. Cl.
CPC ......... *H04B 7/0426* (2013.01); *H04B 7/0602* (2013.01); *H04B 7/0697* (2013.01); *H04J 14/0241* (2013.01); *H04L 41/0826* (2013.01); *H04W 52/346* (2013.01); *H04W 52/42* (2013.01)

(58) Field of Classification Search
CPC .. H04B 7/0426; H04B 7/0697; H04B 7/0602; H04W 52/42; H04W 52/346; H04L 41/0826; H04J 14/0241
See application file for complete search history.

(56) References Cited

U.S. PATENT DOCUMENTS 9,077,577 B1 * 7/2015 Ashrafi ................ H04L 27/362
2006/0251421 A1 * 11/2006 Arnon ...................... H04B 7/10
398/73
(Continued)

OTHER PUBLICATIONS

B. G. Lee et al., "End-to-end multicore multimode fiber optic link operating up to 120 Gb/s," J. Lightw. Technol., vol. 30, No. 6, pp. 886-892, Mar. 2012 (Spec)—7 pages.
(Continued)

*Primary Examiner* — Kenneth T Lam
(74) *Attorney, Agent, or Firm* — Roach Brown McCarthy & Gruber, P.C.; Kevin D. McCarthy

(57) ABSTRACT

A system for optimizing power allocation for each optical transmitter in an optical transmission system, the system comprises at least two intensity modulated optical transmitters, each of which is controlled by a modulator; an optical channel that can be spatially multiplexed by a multiplexer; and at least two optical detectors, for detecting the transmitted modulated signals. Each of the modulators are adapted to modulate the transmitters such that the electrical power consumption of the optical transmitters is minimized by a modulation scheme of the modulators, that uses energy efficient convex optimization to multiplex the transmitted optical signals, by the multiplexer in a multiple-input-multiple-output (MIMO) scheme. Each of the modulators are adapted to modulate the transmitters such that the capacity is maximized by a modulation scheme of the modulators, that uses energy efficient convex optimization to multiplex the transmitted optical signals, by the multiplexer in a multiple-input-multiple-output (MIMO) scheme.

28 Claims, 13 Drawing Sheets

(51) Int. Cl.
*H04J 14/02* (2006.01)
*H04L 12/24* (2006.01)
*H04W 52/34* (2009.01)
*H04W 52/42* (2009.01)

(56) References Cited

U.S. PATENT DOCUMENTS

| | | | | |
|---|---|---|---|---|
| 2014/0044043 | A1* | 2/2014 | Moshfeghi | H04W 84/00 370/328 |
| 2015/0126236 | A1* | 5/2015 | Mukherjee | H04B 7/0417 455/522 |
| 2016/0043794 | A1* | 2/2016 | Ashrafi | H04B 7/0697 370/329 |
| 2016/0127073 | A1* | 5/2016 | Ashrafi | H04B 10/516 398/44 |
| 2018/0262243 | A1* | 9/2018 | Ashrafi | H04B 7/0456 |

OTHER PUBLICATIONS

H. Roscher, F. Rinaldi, and R. Michalzik, "Small-pitch flip-chip-bonded VCSEL arrays enabling transmitter redundancy and monitoring in 2-D 10-Gbit/s space-parallel fiber transimission," IEEE J. Sel. Topics Quantum Electron., vol. 13, No. 5, p. 1279-1289, Sep./Oct. 2007 (Spec)—11 pages.

G. Stepniak, L. Maksymiuk, and J. Siuzdak, "Influence of mode coupling on mode group diversity multiplexing in multimode fibers," Opt. Quant. Electron., vol. 41, pp. 203-213, 2009 (Spec)—11 pages.

C. P. Tsekrekos, A. Martinez, F. M. Huijskens, and A. M. J. Koonen, "Design considerations for a transparent mode group diversity multiplexing link," IEEE Photon. Technol. Lett, vol. 18, No. 22, pp. 2359-2361, Nov. 2006 (Spec)—3 pages.

M. Kowalczyk, and J. Siuzdak, "Four-channel incoherent MIMO transmission over 4.4-km MM fiber," Microw. Opt. Technol. Lett, vol. 53, No. 3, pp. 502-506, Mar. 2011 (Spec)—5 pages.

* cited by examiner

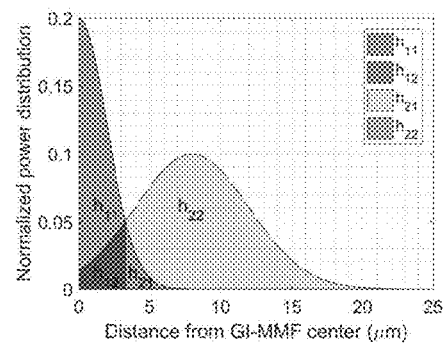
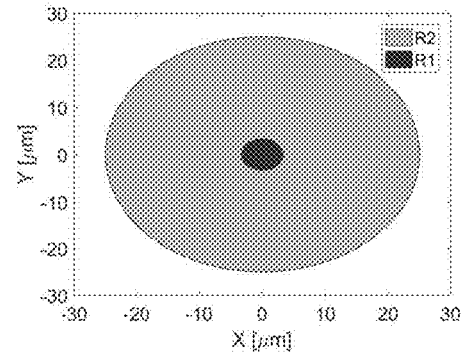
Fig. 2a                      Fig. 2b
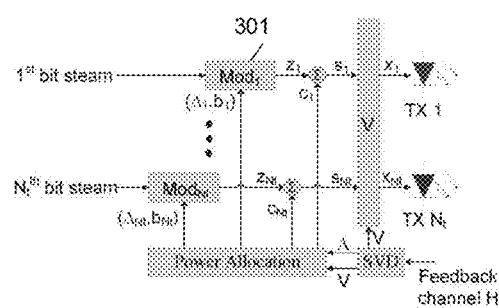
Fig. 3

TABLE I
SYSTEM SIMULATION PARAMETERS

| Parameter | Value | Description |
|---|---|---|
| $b$ | 8 bit/sec/Hz | Desired spectral efficiency |
| $\Gamma$ | 0-10 dB | SNR gap |
| $i_c$ | 10-20 pA/$\sqrt{Hz}$ | Noise current spectral density |
| $N_t$ | 4 | Number of transmitters |
| $N_r$ | 4 | Number of receivers |
| $T$ | 100 psec | Symbol duration |
| $R_{PD}$ | 0.45 A/W | MSD responsivity |
| $\alpha_{margin}$ | 0.25 | Link budget power margin |

Fig. 4a

TABLE II
L-I-V VCSEL SIMULATION PARAMETERS

| Parameter | Value (1310 nm) | Value (850 nm) | Description |
|---|---|---|---|
| $v_{th}$ | 0.9 V | 2 V | Laser threshold voltage |
| $R_d$ | 50 Ω | 100 Ω | Differential series resistance |
| $\eta_{slope}$ | 0.3 mW/mA | 0.2188 mW/mA | Slope efficiency |
| $I_{th}$ | 1.8 mA | 1.8 mA | Laser current threshold |

ENERGY-EFFICIENT POWER AND OFFSET ALLOCATION OF SPATIAL MULTIPLEXING IN MULTIMODE FIBER

FIELD OF THE INVENTION

The invention is in the field of optical transmission systems. More specifically the invention relates to energy efficient power and offset allocation of spatial multiplexing in multimode fiber.

BACKGROUND OF INVENTION

In recent years, an exponential data traffic and electrical power consumption growth is exhibited in high performance computing (HPC) interconnects. Thus, Green Photonics, which tries to minimize the Joule/bit ratio becomes a major subject of both public and scientific interest. A significant amount of the installations within these HPCs are graded-index multimode fibers (GI-MMFs) using parallel rack-to-rack optical interconnects. These fibers enable the use of mode division multiplexing to increase the fiber's capacity.

High speed transmission systems (>10 Gb/s) for short-reach interconnects, such as data-centers and high performance computing (HPC), attracts extensive interest due to the exponential data traffic growth in such applications. The data traffic growth is due to an increase demand for cloud computing, video streaming, and proliferation of smart devices.

On the other hand, this also means that the power consumed by data centers continues to grow exponentially and the fiber volume becomes a significant challenge. Keeping limited natural resources in mind, the topic of Green Photonics has become in the focus of public and scientific interest.

Especially, as copper-based interconnect technology is inefficient, expensive and slow, the transition to optical interconnects has become a reality, with most of the power being consumed by sending data via interconnects within and between racks of servers.

In order to increase the fiber density in HPC systems, parallel optical interconnects are extensively deployed for rack-to-rack interconnects using commercial fiber-coupled optical modules and active optical cables with 8-12 fibers operating at data rages up to 10 Gb/s. Typical commercial Datacom optical modules utilize arrays of Vertical Cavity Surface Emitting Lasers (VCSELs) and GaAs PIN photodiodes coupled to standard 50-µm core multi-mode fiber designed for interconnect distances up to 300 m at 10 Gb/s.

Prior art documents suggested to increase the fiber bandwidth density by the use of multicore fibers (MCFs) with a GI-MMF core using a two-dimensional (2D) array of 850 nm VCSEL (B. G. Lee, D. M. Kuchta, F. E. Doany, C. L. Schow, P. Pepeljugoski, C. Baks, T. F. Taunay, B. Zhu, M. F. Yan, G. E. Oulundsen, D. S. Vaidya, W. Luo, and N. Li, "End-to-end multicore multimode fiber optic link operating up to 120 Gb/s," J. Lightw. Technol., vol. 30, no. 6, pp. 886-892, March 2012). Or alternatively reduce manufacturing and maintenance cost by redundant VCSELs in each GI-MMF in a space-parallel fiber transmission scheme (H. Roscher, F. Rinaldi, and R. Michalzik, "Small-pitch flip-chip-bonded VCSEL arrays enabling transmitter redundancy and monitoring in 2-D 10-Gbit/s space-parallel fiber transmission," IEEE J. Sel. Topics Quantum Electron., vol. 13, no. 5, p. 1279-1289, September/October 2007).

These recent abilities, open a new opportunity for spatial multiplexing optical multiple-input-multiple-output (MIMO) schemes in short reach interconnects, as different mode groups in the GI-MMF are acting as independent communication channels, i.e., mode-group-division-multiplexing (MGDM).

In prior art documents, the performance of intensity modulated spatial multiplexing multiple-input-multiple-output (MIMO) systems over optical fiber channels has been mainly verified by computer simulations and/or experimental results (G. Stepniak, L. Maksymiuk, and J. Siuzdak, "Influence of mode coupling on mode group diversity multiplexing in multimode fibers," Opt. Quant. Electron., vol. 41, pp. 203-213, 2009, C. P. Tsekrekos, A. Martinez, F. M. Huijskens, and A. M. J. Koonen, "Design considerations for a transparent mode group diversity multiplexing link," IEEE Photon. Technol. Lett, vol. 18, no. 22, pp. 2359-2361, November 2006, and M. Kowalczyk, and J. Siuzdak, "Four-channel incoherent MIMO transmission over 4.4-km MM fiber," Microw. Opt. Technol. Lett, vol. 53, no. 3, pp. 502-506, March 2011), However, and to the best of the authors' knowledge, these previous works did not look into analytical approaches to optimally allocate system parameters, such as electrical power, and DC offset of the modulated signal. It should be noticed that the problem the present invention deals with is different from the ones used for the RF MIMO systems since the transmitted signal is constrained to be nonnegative, while RF MIMO solved this issue with no such constraint.

It is therefore an object of the present invention to optimize power allocation for each optical transmitter in an optical transmission system which consists of intensity modulated optical transmitter, an optical channel that can be spatially multiplexed and direct detection optical detectors.

It is another object of the present invention to provide a solution to the margin adaptive problem.

Other objects and advantages of the invention will become apparent as the description proceeds.

SUMMARY OF THE INVENTION

In one aspect the invention relates to a system for optimizing power allocation for each optical transmitter in an optical transmission system; the system comprises:
- at least two intensity modulated optical transmitters, each of which is controlled by a modulator;
- an optical channel that can be spatially multiplexed by a multiplexer; and
- at least two optical detectors, for detecting the transmitted modulated signals;
- wherein each of said modulators are adapted to modulate said transmitters such that the electrical power consumption of said optical transmitters is minimized by a modulation scheme of said modulators, that uses energy efficient convex optimization to multiplex the transmitted optical signals, by said multiplexer in a multiple-input-multiple-output (MIMO) scheme; and
- wherein each of said modulators are adapted to modulate said transmitters such that the capacity is maximized by a modulation scheme of said modulators, that uses energy efficient convex optimization to multiplex the transmitted optical signals, by said multiplexer in a multiple-input-multiple-output (MIMO) scheme.

In an embodiment of the invention, the MIMO output architecture is based upon, Singular Value Decomposition (SVD).

In an embodiment of the invention, the MIMO output architecture is based upon, Vertical Bell Labs Layered Architecture Space Time (V-BLAST).

In an embodiment of the invention, the optical channel is a glass or plastic graded-index multimode fiber.

In an embodiment of the invention, the optical channel is a glass or plastic step-index multimode fiber.

In an embodiment of the invention, the optical channel is a glass or plastic multicore fiber.

In an embodiment of the invention, the power allocation maximizes the capacity of the system instead of minimizing the electrical power consumption of the optical transmitters.

In an embodiment of the invention, the optical transmitters are directly modulated lasers.

In an embodiment of the invention, the optical transmitters are Vertical Cavity Surface Emitting Lasers (VCSELs).

In an embodiment of the invention, the optical transmitters are light emitting diodes (LEDs).

In an embodiment of the invention, the optical transmitters are resonant-cavity LEDs (RC-LEDs), or micro-LEDs.

In an embodiment of the invention, the optical detectors are avalanche-photodiodes, P-I-N photodiodes or multi-segment detectors.

In an embodiment of the invention, the optical transmitters are LEDs or laser, the channel is a plastic multicore fiber and the optical detector is silicon photodiode.

In an embodiment of the invention, the optical transmitters are LEDs or laser, the channel is a plastic graded index fiber and the optical detector is silicon photodiode.

In another aspect the invention relates to a method for optimizing power allocation for each optical transmitter in an optical transmission system which comprises at least two intensity modulated optical transmitters; an optical channel that can be spatially multiplexed and at least two direct detection optical detectors; the method comprises the steps of:

keeping the intensity modulated current above the current of the optical transmitters for ensuring lasing by adding a DC offset to a modulated signal;

allocating each bit stream for a number of bit/sec/Hz, according to the required transmission efficiency of each channel—which is derived from the solution of the convex optimization problem;

keeping the Bit Error Rate (BER) below a predetermined threshold of a target BER, to guarantee a required quality of service by using the SNR gap concept;

thereby using the energy efficient convex optimization for determining the optimal power allocation for each transmitter in said optical transmission system.

In an embodiment of the invention, for multi-segment concentric photo detector (MSD), the intersection points of a normalized power distributions are chosen as the radiuses of the MSD.

In an embodiment of the invention, the MIMO output architecture is based upon, Singular Value Decomposition (SVD).

In an embodiment of the invention, the MIMO output architecture is based upon, Vertical Bell Labs Layered Architecture Space Time (V-BLAST).

In an embodiment of the invention, the optical channel is a glass or plastic graded-index multimode fiber.

In an embodiment of the invention, the optical channel is a glass or plastic step-index multimode fiber.

In an embodiment of the invention, the optical channel is a glass or plastic multicore fiber.

In an embodiment of the invention, the power allocation maximizes the capacity of the optical transmission system instead of minimizing the electrical power consumption of the optical transmitters.

In an embodiment of the invention, the optical transmitters are directly modulated lasers.

In an embodiment of the invention, the optical transmitters are Vertical Cavity Surface Emitting Lasers (VCSEL).

In an embodiment of the invention, the optical transmitters are light emitting diodes (LEDs).

In an embodiment of the invention, the optical transmitters are resonant-cavity LEDs (RC-LEDs), or micro-LEDs.

In an embodiment of the invention, the optical detectors are avalanche-photodiodes, P-I-N photodiodes or multi-segment detectors.

In an embodiment of the invention, the optical transmitters are LEDs or laser, the channel is a plastic multicore fiber and the optical detector is silicon photodiode.

All the above and other characteristics and advantages of the invention will become well understood through the following illustrative and non-limitative description of embodiments thereof, with reference to the appended drawings.

BRIEF DESCRIPTION OF THE DRAWINGS

FIG. 2a schematically shows an illustration of the normalized power distribution of the NFP at the fiber output with relation to the channel matrix elements;

FIG. 2b schematically shows two-segment receiver geometry based on FIG. 2a.

FIG. 3 schematically shows a block diagram of the transmitter of the present invention according to an embodiment of the invention;

FIG. 4a schematically shows a table of parameters used in system simulation;

FIG. 4b schematically shows a table of

DETAILED DESCRIPTION OF THE EMBODIMENTS OF THE INVENTION

Figure 1A:
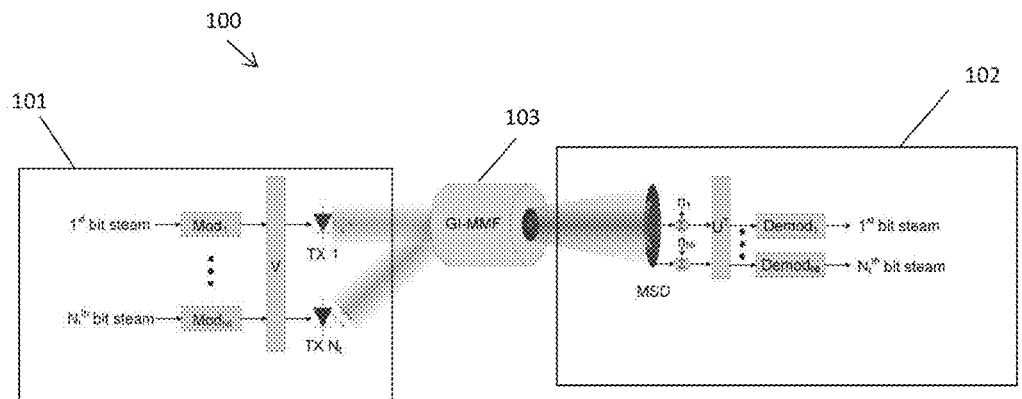
FIG. 1a-1c schematically show examples for different implementations of the system and a channel model of the present invention according to an embodiment of the invention.

The present invention relates to a system and method for optimizing power allocation for each optical transmitter in an optical transmission system which is consisted of at least two intensity modulated optical transmitters, an optical channel that can be spatially multiplexed and at least two direct detection optical detectors. The power allocation minimizes the electrical power consumption of the optical transmitters, by using energy efficient convex optimization to a mode-group-division-multiplexing, multiple-input-multiple-output (MIMO) scheme, which includes for example: a Vertical Cavity Surface Emitting Lasers (VCSEL) array with multi-segment concentric photo-detector.

The system of the present invention MIMO output architecture may be based upon (but not limited to), Singular Value Decomposition (SVD). Alternatively the present invention MIMO output architecture may be based upon (but not limited to), Vertical Bell Labs Layered Architecture Space Time (V-BLAST).

The optical channel of the system of the present invention may be any spatial multi-mode optical fiber (such as: multimode, multicore, graded-index, step-index, etc.).

In an embodiment of the present invention, the optical transmitters are directly modulated lasers.

In another embodiment of the invention, the optical transmitters are Vertical Cavity Surface Emitting Lasers (VCSEL).

In another embodiment of the invention, the optical transmitters are light emitting diodes (LEDs) or resonant-cavity LEDs (RC-LEDs), or micro-LEDs.

In an embodiment of the present invention, the optical detectors are avalanche-photodiodes, P-I-N photodiodes or multi-segment detectors.

For example, the system of the present invention may be implemented by LEDs or laser optical transmitters, a channel which is a plastic multicore fiber and optical detectors, which are silicon photodiodes.

The method of the invention uses energy efficient convex optimization to a mode-group-division-multiplexing MIMO scheme, which includes a Vertical Cavity Surface Emitting Lasers (VCSEL) array with multi-segment concentric photo-detector. The multiple-input-multiple-output architecture can be based upon, but not limited to, Singular Value Decomposition (SVD). This enables to reduce the electrical power consumption, driving current, and temperature of the optical components.

The method of the present invention theoretically derives a power and offset allocation method for an intensity modulated optical multiple-input-multiple-output (MIMO) system with incoherent single-mode Vertical Cavity Surface Emitting Laser (VCSEL) array, which minimizes the electrical power consumption for a required bit rate and an allowed bit error rate. The method of the present invention outperforms simple equal bit and power allocation scheme, achieving a 45-55% electrical power save with a typical required bit error rate of $10^{-6}$.

In the present invention, the power allocation method minimizes the VCSEL's electrical power under the following conditions:

Laser current threshold: The intensity modulated current above the VCSEL's current threshold in order to ensure lasing. Thus, it requires adding a DC offset to the modulated signal.

Spectral efficiency constraint: Each bit stream is allocated for a number of bit/sec/Hz according to the power allocation strategy—which is derived from the solution of the convex optimization problem. This allocation depends on the sub-channels' strength and the fact that the aggregate bit streams should equal a fixed bit rate.

Bit error rate (BER) requirement: The BER performance should be below a target BER level to guarantee the required quality of service.

In the present invention, the offset and power allocation method are formulated over a general incoherent single-mode VCSEL array spatial multiplexing MIMO system using optical fiber. Moreover, geometric design guidelines are given for the optical receiver that will further minimize the VCSEL array's electrical power. The allocation scheme of the method of the present invention outperforms simple equal bit allocation schemes for a novel simple tilted Gaussian beams multiplexer, for GI-MMF with multi-segment concentric photo-detector (MSD) mode-group-division-multiplexing (MGDM) system. Throughout the description, the following notations are used. Upper case and lower case boldface are used to employ matrices and vectors, respectively. For an arbitrary matrix, A, $A^T$ denotes the transpose of A, and det(A) is the determinant of A. For an arbitrary vector a, $[a]_i$ depicts the i-th element of vector a. $\|a\|_p$ denotes the p-norm of vector a. When the inequality symbol ≥ is used between vectors, it denotes element-wise inequality. $\mathbb{E}$ [.] designates the expectation operator.

Figure 1B:
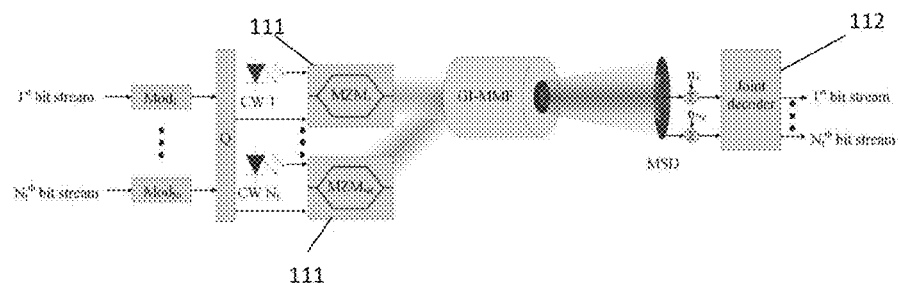
Figure 1C:
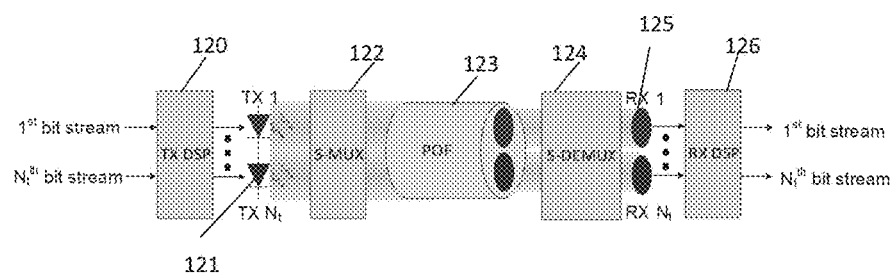

FIGS. 1a-1c schematically shows examples for different implementations of the system and a channel model of the present invention according to an embodiment of the invention. In FIG. 1a, system 100 is a Mode-Group-Division-Multiplexing (MGDM) system model with tilted Gaussian beams multiplexer and multi-segment concentric photo-detector (MSD). System 100 comprises n transmitters at a transmitting side 101, where n>1, n receivers at the receiving side 102, where n>1 and an optical channel 103, which is a graded-index multimode fiber (GI-MMF).

In an embodiment of the invention the transmitters can be implemented of LED transmitters or laser transmitters.

In an embodiment of the invention the fiber can be a multicore plastic fiber and the receiver can be a silicon photodiode detector.

In another embodiment of the invention the receiver can be implemented of a multi-segment detectors.

In an embodiment of the invention, each transmitter at the transmitting side 101 receives as an input a bit stream which is modulated at the modulator 104$i$, the signal is pre-coded at a precoding matrix V, and then transmitted by a LED or laser transmitter through the optical channel 103. The signal is received in the receivers 102, through a post processing matrix $U^T$, and then the signal is demodulated at demodulator 105$i$ to the successful detection of the signal.

In FIG. 1b the architecture is a Vertical Bell Labs Layered Architecture Space Time (V-BLAST), where the transmitters $111_1$, $111_n$ are Mach Zehnder Modulator (MZM) type and in the receiver side the is a joint decoder 112 which can be a matrix as well as DSP module which implements a detector in this architecture.

FIG. 1c schematically shows a third possible architecture with a transmitter DSP module 120 for modulating the signal, transmitters 121, a spatially multiplexer 122, a plastic fiber 123 as the optical channel, a spatially demultiplexer 124, receivers 125 and a receiver DSP module 126 for demodulating the signal.

In an embodiment of the invention, the method of the present invention solves the problem of finding the power allocation which minimized the electrical power consumption, for each transmitter in an optical transmitting system with a given laser current threshold, a predetermined spectral efficiency constraint and a predetermined bit error rate (BER) requirement.

In order to solve the problem, the method of the present invention bring the problem with the above-mentioned constraints to be represented as a convex optimization problem and thereby solving the problem.

In another embodiment of the invention, and as seen in FIG. 1b, the method of power loading of the present invention maximizes the capacity of the system under the following set of constraints:
1) Peak amplitude: the modulated voltage of each i-th SiP MZM 111, should be in the linear regime of the MZM 111, allowing the use of silicon driver.
2) Power consumption: the entire power consumption due to all MZMs 111 is limited. It is assumed that the MZMs' power consumption is mostly RF dominant and is governed by a capacitor load.
3) BER requirement: the BER should be below a target BER level to guarantee the required quality of service.

In an embodiment of the invention, consider a Mode-Group-Division-Multiplexing (MGDM) system model with a spatial multiplexer, e.g., a tilted Gaussian multiplexer, and a spatial de-multiplexer, e.g., an multi-segment concentric photo-detector (MSD), as illustrated in FIG. 1. The i-th electrical current signal, $x_i(t)$, is given by $$x_i(t) = \sum_{k=-\infty}^{\infty} x_i[k]\phi(t-kT), \; i = 1, 2, \ldots, N_t, \quad (1)$$

where $x_i[k]$ is the symbol loaded into the k-th sample, T is the symbol duration, $\phi(t)$ is the pulse shaping function. A sinc pulse shaping function is used, i.e., $$\phi(T) = \mathrm{sinc}(t/T) = \frac{\sin(\pi t/T)}{\pi t/T}. \quad (2)$$

the pulse shaping energy is denoted by $\varepsilon_\phi$, which is given by $$\xi_\phi = \int_0^T \phi^2(t)dt. \quad (3)$$

As for the optical transmitter, the directly modulated VCSEL is modeled as an ideal diode with series resistance. Thus, the i-th VCSEL's voltage obeys $$v_i(t) = v_{th} + R_d \cdot x_i(t), \quad (4)$$

when $v_{th}$ is a positive threshold voltage and $R_d$ is the differential series resistance. Thus, the electrical power consumed by a single VCSEL is given by, $$p_i = \frac{1}{T}\int_0^T \mathbb{E}|v_i(t)x_i(t)|dt, \quad (5)$$

when $x_i(t) \geq 0$. Thus, for the entire VCSEL array the electrical power consumed using (1)-(5) is given by $$p_{total} = \sum_{i=1}^{N_i} p_i = \mathbb{E}\|v_{th}x_k\|_1 + R_d \cdot \mathbb{E}\|x_k\|_2^2, \quad (6)$$

whereas $N_t$ is the number of transmitters, and the transmit vector elements $$[x_k]_i = x_i[k].$$

In general, the relation between the received and the transmitted electrical signals is not simple. Propagation in the GI-MMF introduces dispersion, mode coupling, and has statistical properties. However, in some cases this relation can take the form of a simple matrix. Using incoherent optical transmitters, a simple matrix relation is valid under a statistical modal power with negative-exponential distribution, and uniformly distributed modal phase. Thus, if each modal power is independent of the other modes each Laguerre-Gaussian mode function is associated with an independent zero-mean circular Gaussian coefficient. The Laguerre-Gaussian coefficient's variance is governed by the power coupling coefficient and GI-MMF propagation properties. In turn, the Laguerre-Gaussian mode functions associated with each transmitter are integrated spatially by means of an MSD.

Thus, assuming the channel has a flat frequency response, the received match-filtered k-th sample on each j-th photo-detector can be written as $$y_j[k] = \sum_{i=1}^{N_i} \alpha_{loss}\varepsilon_\phi h_{ji} x_i[k] + n_j[k], \quad (7)$$

where $h_{ji}$ is the channel's gain associated with the i-th transmitter and j-th receiver. In addition, $\alpha_{loss}$ is a common attenuation factor, and $n_j[k]$ is white Gaussian noise with $\mathcal{N}(0,\sigma_n^2)$. Here it should be noted that using (3), $$\sigma_n^2 = \frac{i_c^2}{2}\varepsilon_\phi, \quad (8)$$

where $i_c$ is the noise current spectral density. (7) can be written in matrix form as an additive white Gaussian noise (AWGN) channel, $$y_k = \alpha_{loss}\varepsilon_\phi H x_k + n_k. \quad (9)$$

In (9), the received vector is $y_k \triangleq [y_1[k] \; y_2[k] \ldots y_{N_y}[k]]^T$, the channel matrix is $$H = \begin{bmatrix} h_{11} & h_{12} & \ldots & h_{1N_i} \\ h_{21} & h_{22} & \ldots & h_{2N_i} \\ \vdots & \vdots & \ddots & \vdots \\ h_{N_r 1} & h_{N_r 2} & \ldots & h_{N_r N_i} \end{bmatrix},$$

the transmit vector is $x_k \triangleq [x_1[k] \; x_2[k] \ldots x_{N_t}[k]]^T$, and the noise vector is $n_k \triangleq [n_1[k] \; n_2[k] \ldots n_{N_r}[k]]^T$.

In order to properly calculate the channel matrix coefficients, $h_{ji}$, the aforementioned model is used.

First, an overlap integral is used between the radially offset beams transmission, or using tilted beams transmission and the GI-MMF's Laguerre-Gaussian mode functions. This calculation results in a power-coupling coefficient, i.e., the expected power in the m-th output mode, upon launching unity power into the n-th input mode.

Secondly, the propagation through the GI-MMF's mode coupling, $d_{m,n}$, is governed by the following formulas $$d_{m,n} = A \cdot \left[ \frac{(\pi k_o c \varepsilon_0)^2}{8} \cdot \rho_{m,n}^2 \cdot \frac{1}{(\Delta\beta_{m,n})^8} \right], \quad (10)$$

$$\rho_{m,n} = \int_0^\infty r E_m(r) E_n(r) \frac{\partial \bar{n}^2}{\partial r} dr, \quad (11)$$

where $E_m(r)$ is the radial component of the normalized electrical field for mode m, $\Delta\beta_{m,n}$ is the difference in the propagation constants between modes m and n, $\bar{n}(r)$ is the refractive index profile, A is the mode-coupling strength, $k_o$ is wavenumber in free space, c is the speed of light, and $\varepsilon_0$ is the permittivity of free space. The propagation through the GI-MMF can be described using the notion of degenerate mode groups, whereas a degenerate mode group are all the modes sharing a common propagation constant, β. Thus, if it is assumed that different degenerate mode groups are well separated in terms of propagation constants, it leads, as seen in (10), to negligible crosstalk between them at the receiver. On the other hand, it is assumed that the modes within a degenerate mode group are fully mixed, thus having the same powers, i.e., the same Laguerre-Gaussian coefficient's variance. Practically, these assumptions are valid within a fiber length of some hundreds or even thousands of meters.

Lastly, spatial de-multiplexing is carried out on each set of degenerate mode groups associated with its transmitter independently by means of MSD. Thus, as illustrated in FIG. 2, the channel matrix coefficients, $h_{ji}$, can be estimated by $$h_{ji} = \frac{\int\int_{R_j} I_i(r,\phi) r dr d\phi}{\int_0^{2\pi}\int_0^{r_{co}} I_i(r,\phi) r dr d\phi}, \quad (12)$$

where $I_i(r,\phi)$ is the power distribution of the near-field-pattern (NFP) caused by the i-th transmitter beam on the fiber output, associated with the i-th electrical current signal. $R_j$ is the area of the j-th receiver photo-detector segment, and $r_{co}$ is the core radius of the GI-MMF. Here, it should be noted that the power distributions of the NFP exhibit a disk shape using radially offset beams transmission, or using tilted beams transmission. This leaves the radius of each j-th photo-detector segment as a degree of freedom for the designer.

FIG. 2a schematically shows an Illustration of the normalized power distribution of the NFP (near-field-pattern) at the fiber output with relation to the channel matrix elements. FIG. 2b schematically shows two-segment receiver geometry based on FIG. 2a.

FIG. 3 schematically shows a block diagram of the transmitter of the present invention according to an embodiment of the invention. For a specific i-th modulator 301: $b_i$ denotes the bits per dimension, $\Delta_i$ is the maximum Pulse Amplitude Modulated (PAM) symbol, $s_i$ is the biased modulator output with a $c_i$ offset of a $z_i$ PAM output. $x_i$ is the electrical current signal of the i-th transmitter after precoding matrix, v, of the biased modulators. Λ is the singular values matrix of the channel matrix, H.

In an embodiment of the invention, the power allocation maximizes the capacity of the system instead of minimizing the electrical power consumption of the optical transmitters.

Generally, the capacity, in terms of maximum spectral efficiency, of closed-loop MIMO, i.e., known to both the transmitter and the receiver, with additive white Gaussian noise, can be computed by decomposing the deterministic channel matrix, H, into a set of parallel, independent scalar Gaussian sub-channels, as seen in FIG. 1. Although it is assumed that the channel matrix is quite steady, in case of variation in channel conditions a feedback channel is assumed, as seen in FIG. 3. The feedback channel allows the channel matrix variations to be handled using a power and offset re-allocation. Theoretically, even a dynamic tilt or offset beams transmission combined with power and offset re-allocation is possible for channel matrix variation compensation. In an embodiment of the invention, the decomposition of the channel matrix can be performed using a Singular Value Decomposition (SVD):

$$H = U\Lambda V^T. \quad (13)$$

Where $U \in \mathbb{R}^{N_r \times N_r}$ and $V \in \mathbb{R}^{N_t \times N_t}$ are unitary matrices and $\Lambda \in \mathbb{R}^{N_r \times N_t}$ is a rectangular matrix, whose diagonal elements are non-negative real numbers and whose off-diagonal elements are zero. The diagonal elements $\lambda_1 \geq \lambda_2 \geq \ldots \geq \lambda_N$ are the ordered singular values of the matrix H, where it is assumed that $N_t \leq N_r$.

Thus, a precoding matrix v can be used at the transmitter and a post-processing matrix $U^T$ at the receiver, i.e., $$x_k = V s_k. \quad (14)$$

$$r_k \triangleq U^T y_k. \quad (15)$$

When the output of the modulators at the k-th sample are $s_k \triangleq [s_1[k]\ s_2[k]\ \ldots\ s_{N_t}[k]]^T$, and $r_k \triangleq [r_1[k]\ r_2[k]\ \ldots\ r_{N_r}[k]]^T$ is the rotated received vector after post-processing.

The usage of the precoding and post-processing matrices has lead into a set of parallel, independent scalar Gaussian sub-channels:

$$r_k = \alpha_{loss} \varepsilon_\phi \Lambda s_k + w_k. \quad (16)$$

Where $w_k \triangleq U^T n_k$ is the rotated received noise with the same Gaussian distribution parameters for each element of $w_k$, i.e., $\mathcal{N}(0, \sigma_u^2)$.

In this case of parallel Gaussian sub-channels, the capacity is achieved if each i-th modulator has a Gaussian distribution, which has the maximum differential entropy for a given variance. Mathematically, when the symbol energy applied to each i-th modulator of $s_k$ is $\varepsilon_i$, i.e., the symbol variance is given by $$\mathbb{E}\left([s_k]_i - \mathbb{E}[s_k]_i\right)^2 = \varepsilon_i. \quad (17)$$

And when there are no other constraints the capacity is achieved when $$s_k \sim \mathcal{N}\left(0, \begin{bmatrix} \varepsilon_1 & 0 & \ldots & 0 \\ 0 & \varepsilon_2 & \ldots & 0 \\ \vdots & \vdots & \ddots & \vdots \\ 0 & 0 & \ldots & \varepsilon_{N_i} \end{bmatrix}\right). \quad (18)$$

In this case of the present invention, the capacity is given by $$b_{cap} = \sum_{i=1}^{N_i} \frac{1}{2} \log_2(1 + \varepsilon_i g_i), \quad (19)$$

Where $$g_i \triangleq \frac{\alpha_{loss}^2 \varepsilon_\phi^2 \lambda_i^2}{\sigma_n^2} \quad (20)$$

represents the sub-channel's signal-to-noise ratio, when the modulator applies unit energy to that sub-channel.

Practically, as seen in FIG. 3, multi-level Pulse Amplitude Modulation (PAM) was adopted in the present invention to obtain high spectral efficiency with offset vector to directly modulate an optical laser transmitter. The output of the biased modulators at the k-th sample, $s_k$, is defined as $$s_k = z_k + c. \quad (21)$$

In (21), $z_k \triangleq [z_1[k]\ z_2[k]\ \ldots\ z_{N_t}[k]]^T$ is the output vector of a multi-level PAM with zero mean, i.e., $\mathbb{E}[z_k]=0$, where 0 is an $N_t \times 1$ zero vector, and $c \triangleq [c_1\ c_2\ \ldots\ c_{N_t}]^T$ is the offset vector to satisfy the laser current threshold constraint applied to the electrical current signal, $x_k$. Now, the number of signal constellation points is denoted as $M_i$, and the maximum PAM symbol of the unbiased modulator is denoted as $\Delta_i$. Moreover, for uncoded multi-level PAM, $$M_i = 2^{b_i}, \quad (22)$$

where $b_i$ is the bits per dimension of the i-th modulator. Thus, the pair $b_i$, $\Delta_i$ uniquely defines the multi-level PAM signal constellation of the i-th modulator having a zero mean. Subsequently, multiplying the precoding matrix, $v$, by the modulated vector, $s_k$, the transmit vector can be rewritten as $$x_k = V s_k = V(z_k + c) = V z_k + q, \quad (23)$$

where $$q \triangleq Vc, \quad (24)$$

and q is the mean of the transmitted vector, i.e., $E[x_k]=q$. Furthermore, the corresponding received vector can be written as $$r_k = \alpha_{loss}\varepsilon_\phi \Lambda z_k + \alpha_{loss}\varepsilon_\phi \Lambda c + w_k. \quad (25)$$

Using the fact that a set of parallel, independent scalar Gaussian sub-channels is reached, it is easy to perform maximum likelihood decoding for each i-th data stream independently, i.e., $$\hat{z}_i[k] = \arg\min_{\tilde{z}_i[k]\in \mathcal{Z}_i} \|(r_i[k] - \alpha_{loss}\varepsilon_\phi\lambda_i c_i) - \alpha_{loss}\varepsilon_\phi\lambda_i\tilde{z}_i[k]\|_2^2, \quad (26)$$

$$i = 1, 2, \ldots, N_i,$$

where $\mathcal{Z}_i$ is the set of all the signal constellation points in the i-th multi-level PAM. Therefore, (24) can be implemented using a symbol by symbol slicer for each independent i-th data stream.

In order to guarantee the reliability of the decoded data stream, it is desirable to have all sub-channels with the same error probability. Otherwise, if one sub-channel has significantly higher error probability, then it would dominate bit error rate. Thus, it is required that: $BER_i \leq BER_T$, i=1, 2, . . . , $N_t$, where $BER_i$ is the bit error rate for the i-th bit stream, and $BER_T$ denotes the target BER.

Here it is worth to notice that any real system must transmit at a bit rate less than capacity. Thus, the achievable spectral efficiency can be expressed approximately as $$b_{max} = \sum_{i=1}^{N_i} \frac{1}{2}\log_2\left(1 + \frac{\varepsilon_i g_i}{\Gamma}\right), \quad (27)$$

when $\Gamma$ is defined as the SNR gap. The SNR gap, represents a loss with respect to Shannon capacity. The SNR gap analysis is widely used in the bit loading of OFDM systems, since it separates coding gain from power allocation gain. This approach can be applied, also in fiber optics, where, for any uncoded AWGN sub-channel, the SNR gap can be approximated by:

$$\Gamma = \frac{\zeta^2}{3}, \quad (28)$$

where $\zeta = Q^{-1}(P_e)$, $P_e$ is the symbol-error probability, and $Q^{-1}$ is the inverse Q function. It is assumed that the allowed symbol-error probability $P_e \approx BER_T$ for all sub-channels. As an example, in the case of $BER_T = 10^{-6}$, the required SNR gap, $\Gamma$, is 8.8 dB. It is here worth to mention that the pre-FEC BER requirement of the Ethernet 400GBASE-SR16 standard is a BER below $2.4 \times 10^{-4}$.

Theoretically, it is desirable to design a system that maximizes the achievable spectral efficiency. Alternatively, one can use the spectral efficiency as a design constraint and minimize the VCSEL's electrical power.

In this section, the defined target is to formulate an optimization problem based on a single optimization vector, which minimizes the objective function $p_{total}$ under a set of constraints. Summarized below are the three constraints of the present invention:

Laser current threshold: $x_k \geq I_{th}$
Spectral efficiency constraint:

$$b = \sum_{i=1}^{N_i} b_i,$$

where b is the desired spectral efficiency.

BER requirement: $BER_i \leq BER_T$, i=1, 2, . . . , $N_t$, where $BER_i$ is the bit error rate for the i-th bit stream, and $BER_T$ denotes the target BER.

Mathematically, using (6), the power minimization subject to the three mentioned above constraints, is formulated in the following set of equations below as:

$$\text{minimize } \mathbb{E}\|v_{th}x_k\|_1 + R_d \cdot \mathbb{E}\|x_k\mu_2^2 \quad (29a)$$

$$\text{subject to } x_k \geq I_{th}, \quad (29b)$$

$$b = \sum_{i=1}^{N_i} b_i, \quad (29c)$$

$$BER_i \leq BER_T, i=1,2,\ldots,N_t \quad (29d)$$

Using the SNR gap concept, the BER requirement can be integrated into the spectral efficiency constraint. Also, it should be noted that for a given coding scheme, practical transmission designs often mandate a specific value for b, and not necessarily the achievable spectral efficiency, $b_{max}$. In turn, the margin measures the excess SNR for that given spectral efficiency, b. Thus, (27) can be rewritten as $$b = \sum_{i=1}^{N_i} \frac{1}{2}\log_2\left(1 + \frac{\tilde{\varepsilon}_i g_i}{\Gamma}\right), \quad (30)$$

when $$\tilde{\varepsilon}_i \triangleq \frac{\varepsilon_i}{\gamma_m}, \gamma_m \quad (5)$$

denotes the excess SNR margin, and $\Gamma$ is a function of our BER requirement, $BER_T$. Furthermore, using (24), the constrained symbol energy in the i-th modulator, $\bar{\varepsilon}_i$, and the fact that $x_k \geq 0$, (29a) can also be rewritten as $$\mathbb{E}\|v_{th}x_k\|_1 + R_d \cdot \mathbb{E}\|x_k\|_2^2 = v_{th}\|q\|_1 + R_d\left(\|q\|_2^2 + \sum_{i=1}^{N_i}\tilde{\varepsilon}_i\right). \quad (31)$$

For this reason, the electrical power minimization problem can be rewritten as
minimize $$v_{th}\|q\|_1 + R_d\left(\|q\|_2^2 + \sum_{i=1}^{N_i}\tilde{\varepsilon}_i\right) \quad (32a)$$

subject to $x_k \geq I_{th}$, (32b)

$$b = \sum_{i=1}^{N_i} \frac{1}{2}\log_2\left(1 + \frac{\tilde{\varepsilon}_i g_i}{\Gamma}\right). \quad (32c)$$

Moreover, as described above, the transmitted vector is dependent on the offset vector, modulation and precoding matrix. Thus, using (23), the electrical power minimization problem can be rewritten as
minimize $$v_{th}\|q\|_1 + R_d\left(\|q\|_2^2 + \sum_{i=1}^{N_i}\tilde{\varepsilon}_i\right) \quad (33a)$$

subject to $v(z_k+p) \geq I_{th}$, (33b)

$$b = \sum_{i=1}^{N_i} \frac{1}{2}\log_2\left(1 + \frac{\tilde{\varepsilon}_i g_i}{\Gamma}\right). \quad (33c)$$

Now, the problem will be equivalently modify to a single parameter problem, i.e., the distance vector. The distance vector is defined as $\Delta \triangleq [\Delta_1 \ \Delta_2 \ \ldots \ \Delta_{N_i}]^T$, where each element $\Delta_i$ is the maximum PAM symbol of the i-th unbiased modulator mentioned before.

The relation between offset vector, c, and the distance vector, $\Delta$, which minimizes the output electrical current of each i-th modulator, is given by $$c = V^T \cdot (\text{abs}(V) \cdot \Delta + I_{th}), \quad (34)$$

where abs(•) denotes an element-wise absolute operator. Thus, using (24), and (34), the electrical power minimization problem can be rewritten as
minimize $$\begin{pmatrix} v_{th}\|I_{th}\|_1 + v_{th}\|\text{abs}(V) \cdot \Delta\|_1 + \\ R_d\left(\|\text{abs}(V) \cdot \Delta + I_{th}\|_2^2 + \sum_{i=1}^{N_i}\tilde{\varepsilon}_i\right) \end{pmatrix} \quad (35a)$$

subject to $\Delta \geq 0$, (35b)

$$b = \sum_{i=1}^{N_i} \frac{1}{2}\log_2\left(1 + \frac{\tilde{\varepsilon}_i g_i}{\Gamma}\right). \quad (35c)$$

the symbol energy applied to each i-th modulator in the optimization problem, i.e., $\bar{\varepsilon}_i$, can also be described using the number of signal constellation points, $M_i$, and maximum PAM symbol, $\Delta_i$. Since the minimum distance between two symbols can be computed as $$\delta_i = \frac{2}{M_i - 1}\Delta_i,$$

it is received that $$\bar{\varepsilon}_i = \frac{1}{M_i}\sum_{j=0}^{M_i-1}(-\Delta_i + j\delta_i)^2 = \frac{\Delta_i^2}{3}\left(\frac{M_i+1}{M_i-1}\right). \quad (36)$$

Thus, using (36), the electrical power minimization problem can be rewritten as
minimize $$\begin{pmatrix} v_{th}\|I_{th}\|_1 + v_{th}\|\text{abs}(V) \cdot \Delta\|_1 + \\ R_d \left[ \begin{array}{l} \|\text{abs}(V) \cdot \Delta + I_{th}\|_2^2 + \\ \sum_{i=1}^{N_i} \frac{\Delta_i^2}{3}\left(\frac{M_i+1}{M_i-1}\right) \end{array} \right] \end{pmatrix} \quad (37a)$$

subject to $\Delta \geq 0$, (37b)

$$b = \sum_{i=1}^{N_i} \frac{1}{2}\log_2\left(1 + \frac{g_i}{\Gamma} \cdot \frac{\Delta_i^2}{3}\left(\frac{M_i+1}{M_i-1}\right)\right). \quad (37c)$$

It should be noticed that using (29c), and (37c), it is received that $$b_i = \frac{1}{2}\log_2\left(1 + \frac{g_i}{\Gamma} \cdot \frac{\Delta_i^2}{3}\left(\frac{M_i+1}{M_i-1}\right)\right), \quad (38)$$

for each i-th modulator. Furthermore, using (20), (22) and (38), after simple mathematical manipulations, it can be shown that $$b_i = \log_2\left(1 + \frac{\alpha_{loss}\varepsilon_\phi\lambda_i}{\sigma_n} \cdot \sqrt{\frac{1}{3\Gamma}} \cdot \Delta_i\right), \quad (39a)$$

$$\bar{\varepsilon}_i = \frac{\Delta_i^2}{3} + 2\Delta_i \cdot \sqrt{\frac{\Gamma}{3}} \cdot \frac{\sigma_n}{\alpha_{loss}\varepsilon_\phi\lambda_i}. \quad (39b)$$

Leading to the following restatement of the electrical power minimization problem as minimize $$\left\{v_{th}\|I_{th}\|_1 + v_{th}\|\text{abs}(V) \cdot \Delta\|_1 + \right. \quad (40a)$$

$$\left. R_d\left[\|\text{abs}(V) \cdot \Delta + I_{th}\|_2^2 + \frac{1}{3}\|\Delta\|_2^2 + \sum_{i=1}^{N_i} 2\Delta_i \cdot \sqrt{\frac{\Gamma}{3}} \cdot \frac{\sigma_n}{\alpha_{loss}\varepsilon_\phi\lambda_i}\right]\right\}$$

subject to $\Delta \geq 0$, (40b)

$$b = \sum_{i=1}^{N_i} \log_2\left(1 + \frac{\alpha_{loss}\varepsilon_\phi\lambda_i}{\sigma_n} \cdot \sqrt{\frac{1}{3\Gamma}} \cdot \Delta_i\right). \quad (40c)$$

Equations (40a)-(40c) formulate the VCSEL's electrical power optimization problem based on a single optimization variable, which is the distance vector, $\Delta$. The problem parameters include:

A channel matrix H, which is associated with the singular values $\lambda_i$, and precoding matrix V.

The VCSEL's L-I-V curve parameters, i.e., laser threshold voltage, $v_{th}$, differential series resistance, $R_d$ and laser current threshold, $I_{th}$.

The required target BER, $BER_T$, which is associated with the SNR gap, $\Gamma$, using (28).

The desired spectral efficiency, b.

The noise current spectral density, $i_c$, which is associated with the noise standard deviation per sub-channel, $\sigma_n$, using (8).

The common aggregated attenuation, $\alpha_{loss}$.

The pulse shaping energy, $\varepsilon_\phi$, which is associated to the symbol duration, T, by (3).

The formulated problem minimizes the electrical power given a fixed spectral efficiency, in this sense, this problem is a margin-adaptive loading problem. However, it is not a classical water-filling, as the objective function is not linear with respect to the optimization variable. It includes both a linear and a square term with respect to the optimization variable.

Nevertheless, the formulated problem can be easily transformed into a convex optimization problem in standard form. Let us denote, $$f_0(\Delta) \triangleq \left\{v_{th}\|I_{th}\|_1 + v_{th}\|\text{abs}(V) \cdot \Delta\|_1 + \right. \quad (41a)$$

$$\left. R_d\left[\|\text{abs}(V) \cdot \Delta + I_{th}\|_2^2 + \frac{1}{3}\|\Delta\|_2^2 + \sum_{i=1}^{N_i} 2\Delta_i \cdot \sqrt{\frac{\Gamma}{3} \cdot \frac{\sigma_n}{\alpha_{loss}\varepsilon_\phi\lambda_i}}\right]\right\},$$

$$f_1(\Delta) \triangleq -\Delta, \quad (41b)$$

$$f_2(\Delta) \triangleq b - \sum_{i=1}^{N_i} \log_2\left(1 + \frac{\alpha_{loss}\varepsilon_\phi\lambda_i}{\sigma_n} \cdot \sqrt{\frac{1}{3\Gamma}} \cdot \Delta_i\right). \quad (41c)$$

Thus, (40a)-(40c) can be rewritten as, minimize $f_0(\Delta)$ (42a)

subject to $f_1(\Delta) \leq 0$, (42b)

$f_2(\Delta) \leq 0$. (42c)

The objective function, $f_0(\Delta)$, is a non-negative weighted summation of convex functions and thus convex. The constraint functions, $f_1(\Delta)$ and $f_2(\Delta)$ are also convex. It should be noticed that, an equality constraint, (40c), have been replaced with an inequality constraint in (42c) to meet the convex optimization standard form. Now, as the primal problem is convex, the Karush-Kuhn-Tucker (KKT) conditions are also sufficient for the points to be primal and dual optimal, i.e., with zero duality gap. Thus, a freedom of choices exists between solving the primal or KKT conditions.

An example can be given in connection to multi segment concentric photo detector. The electrical power minimization problem assumes a given channel matrix H. However, a general question arises: can the optical multiplexer and de-multiplexer of the present invention be optimized, i.e., their physical attributes and thus further improve the system achievable spectral efficiency?

In the present invention an explanation is given for selecting the intersections between the normalized power distributions functions as an intelligent selection for the MSD's radiuses.

First, let us rewrite our required spectral efficiency, (40c), as $$b(r_{PD}) = \sum_{i=1}^{N_i} \log_2\left(1 + \frac{\alpha_{loss}\varepsilon_\phi\lambda_i}{\sigma_n} \cdot \sqrt{\frac{1}{3\Gamma}} \cdot \Delta_i\right) \quad (43)$$

$$\approx \sum_{i=1}^{N_i} \log_2\left(\frac{\Delta_i}{\sigma_n} \cdot \sqrt{\frac{1}{3\Gamma}}\right) + \alpha_{loss}\varepsilon_\phi \log_2\left(\sum_{i=1}^{N_i} \lambda_i(r_{PD})\right).$$

When $b(r_{PD})$, now marks the achievable spectral efficiency when the channel matrix H, is dependent upon the MSD's radius vector, $r_{PD}$. Moreover, it is assumed that the sub-channel's signal-to-noise ratio is much greater than 1, i.e., $$\frac{\alpha_{loss}\varepsilon_\phi\lambda_i(r_{PD})}{\sigma_n} \cdot \sqrt{\frac{1}{3\Gamma}} \cdot \Delta_i \gg 1. \quad (44)$$

From (43) it is clear that we actually want to maximize the following term:
max.

$$\frac{1}{2}\log_2(\det(H(r_{PD})^T H(r_{PD}))) = \log_2\left(\sum_{i=1}^{N_i} \lambda_i(r_{PD})\right). \quad (45)$$

Using (12) and the fact the maximum radius in $r_{PD}$ is $r_{co}$, the channel matrix can written as $$H(r_{PD}) = \begin{bmatrix} 1 - \sum_{j=1,j\neq 1}^{N_r} h_{j1} & h_{12} & \cdots & h_{1N_i} \\ h_{21} & 1 - \sum_{j=1,j\neq 2}^{N_r} h_{j2} & \cdots & h_{2N_i} \\ \vdots & \vdots & \ddots & \vdots \\ h_{N_r 1} & h_{N_r 2} & \cdots & 1 - \sum_{j=1,j\neq N_i}^{N_r} h_{jN_i} \end{bmatrix}. \quad (46)$$

Now, assuming that the off-diagonal elements in the matrix, $H(r_{PD})$, are relatively small compared to the diagonal elements of the matrix, it can be shown that $$\det(H(r_{PD})^T H(r_{PD})) \approx 1 - 2\sum_{i=1}^{N_i}\sum_{j=1,j\neq i}^{N_r} h_{ji}, \quad (47)$$

when all the multiplications between off-diagonal elements are neglected. This assumption is valid when the radial overlap between the normalized power distributions, which originate from different transmission beams is relatively small. Thus, in order to maximize the spectral efficiency, it is desired to minimize the off-diagonal elements of the channel matrix. This leads to choosing the intersection points of the normalized power distributions as the MSD's radiuses. Any other MSD's radiuses selection increases the sum of the off-diagonal elements contribution, $$\sum_{i=1}^{N_i}\sum_{j=1,j\neq i}^{N_r} h_{ji}.$$

Intuitively, this problem is similar to selecting the threshold point of a classical hard decision slicer, which minimizes the BER. The minimum BER is obtained by selecting the slicer thresholds at the intersection of the symbol's conditional probability density function at the receiver. The analogy to the symbol's conditional probability density functions are the normalized power distributions, as illustrated in FIG. 2.

Although (43) is based on the assumption that the off-diagonal elements in the matrix are relatively small compared to the diagonal elements of the matrix, it is shown to be a good practical method of MSD design in other cases as well.

System Simulation

Figure 4C:
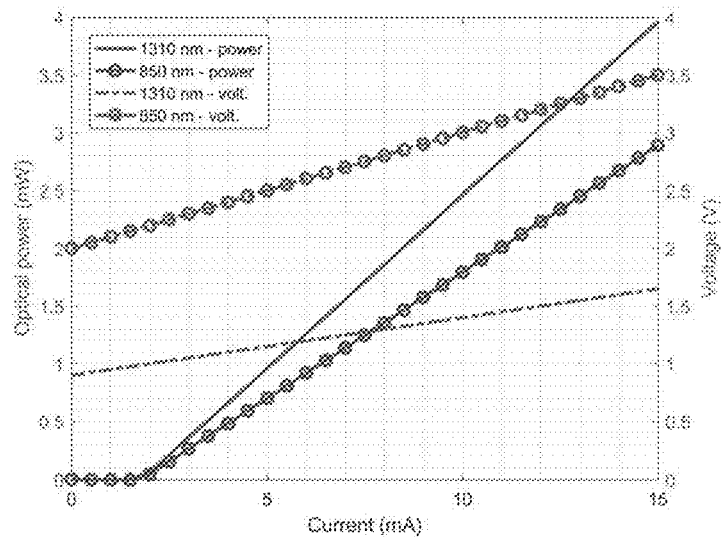
FIG. 4c the L-I-V characteristics of a typical 1310 nm/850 nm VCSEL according to schematically shows the parameters in FIG. 4b (Table II)

In this section, quantitative analysis of the power optimization scheme developed above are performed, which is summarized in (40a)-(40c). The analysis is performed on an MGDM system, as described in, and presented in FIG. 1. both 1310 nm and 850 nm VCSEL wavelength are examined. The system simulation parameters used are given in FIG. 4a (Table I). The wavelength dependent parameters, which are the L-I-V VCSEL parameters, are given in FIG. 4b (Table II). FIG. 4c schematically shows the L-I-V characteristics of a typical 1310 nm/850 nm VCSEL according to the parameters of FIG. 4b (Table II).

The $\alpha_{loss}$ is the common aggregated attenuation due to the slope efficiency, $\eta_{slope}$, the link budget power margin, $\alpha_{margin}$, and the MSD responsivity, $R_{PD}$, which is calculated via: $\alpha_{loss} = \eta_{slope} \cdot \alpha_{margin} \cdot R_{PD}$. The MSD bandwidth is assumed to be larger than the transmitter's pulse shaping bandwidth. For example, a larger than 8 GHz MSD bandwidth.

The channel matrices are calculated using the normalized overlap integral given in (12)

In FIGS. 5a-5i, the mean and a random realization of the power distribution at the fiber facet output is shown for 4 tilted Gaussian beams VCSEL transmitters at 850 nm. Each of the VCSEL transmitters at the fiber facet input has a different tilt and a different full-width-half-maximum (FWHM) parameter. The 4 tilts and 4 FWHM parameters are chosen such that the cross-talk observed by the MSD is minimized.

Figure 5A:
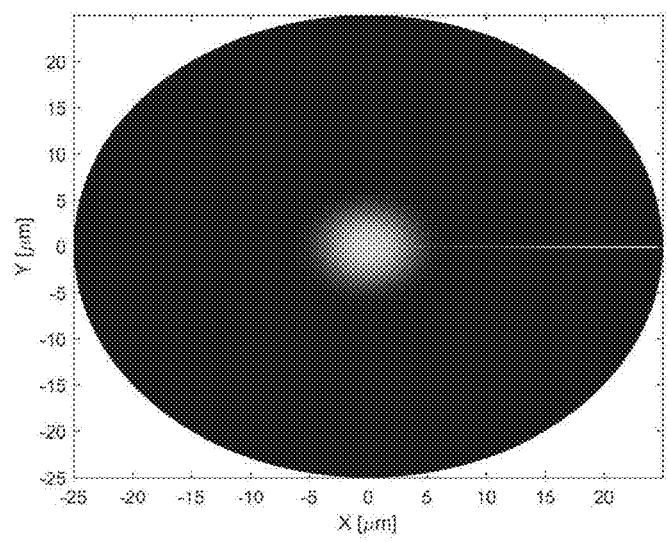
FIG. 5a-5i schematically show normalized power distribution (mean and random realization) of the NFP at the fiber output of a 50 μm GI-MMF, excited by 4 tilted Gaussian beams at 850 nm.
Figure 5B:
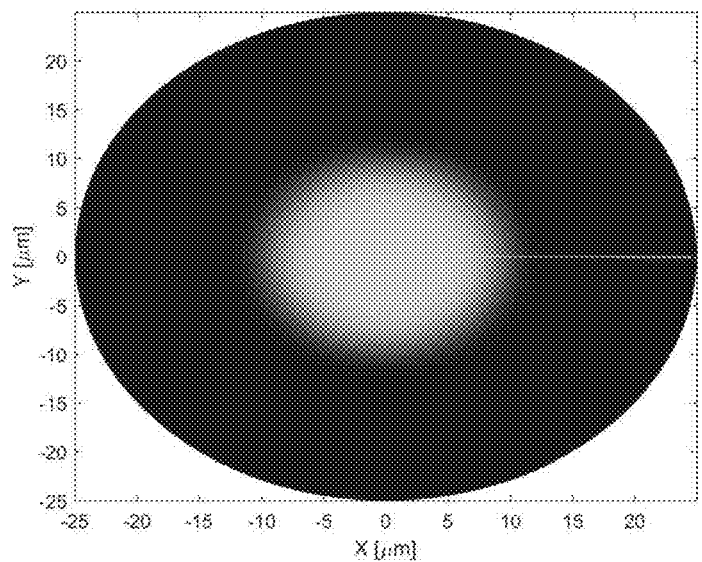
Figure 5C:
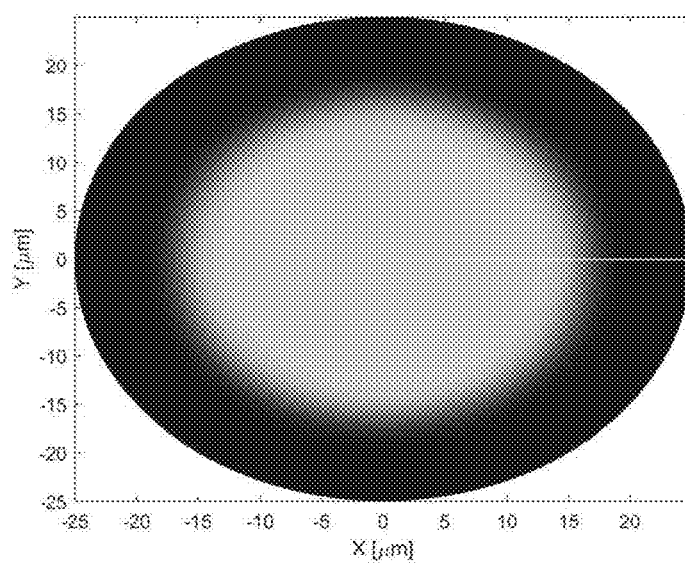
Figure 5D:
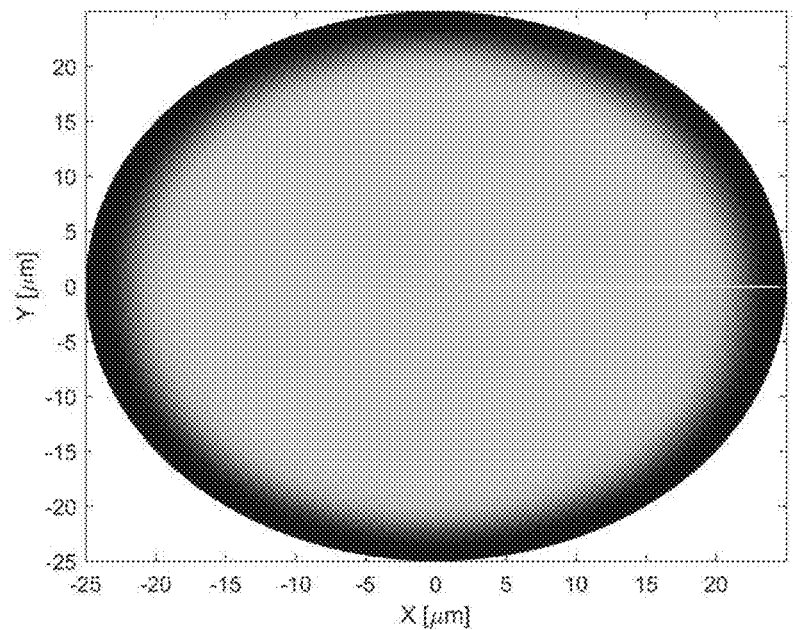
Figure 5E:
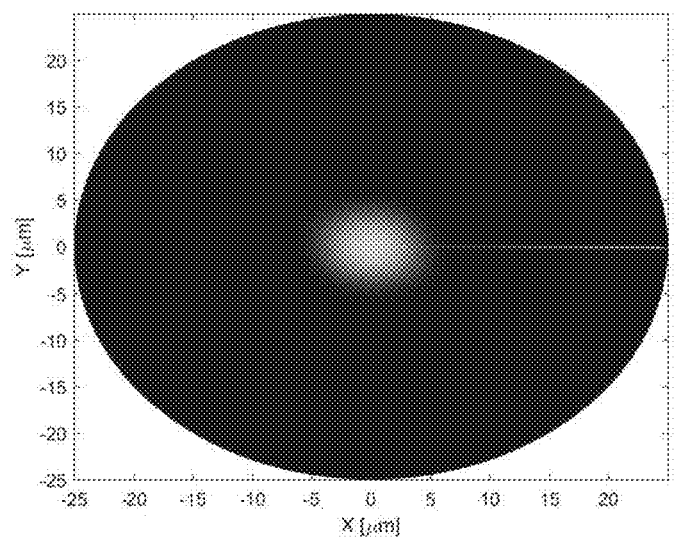
Figure 5F:
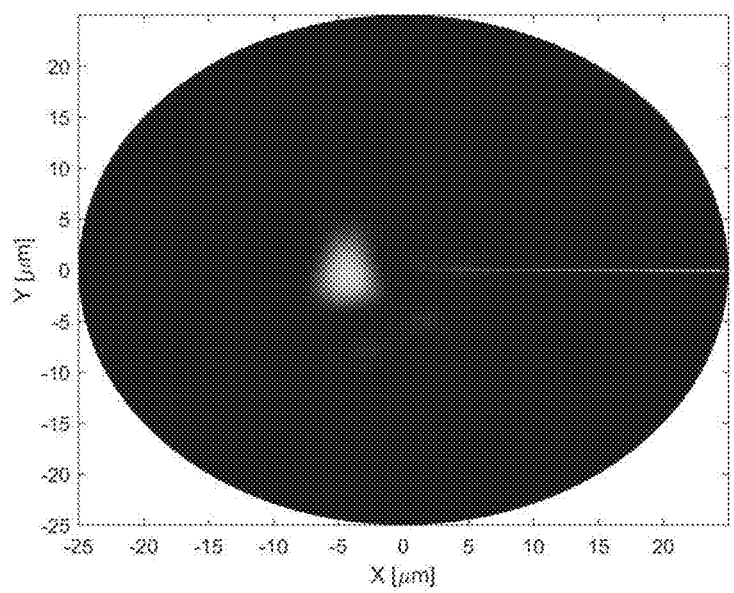
Figure 5G:
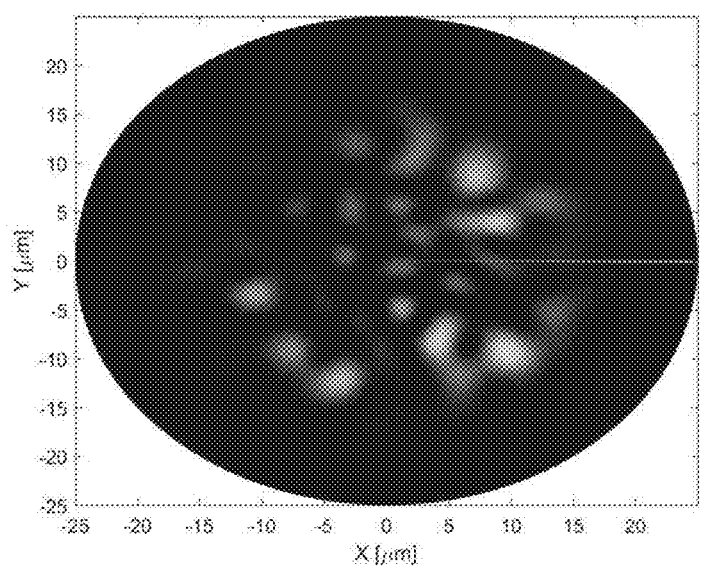
Figure 5H:
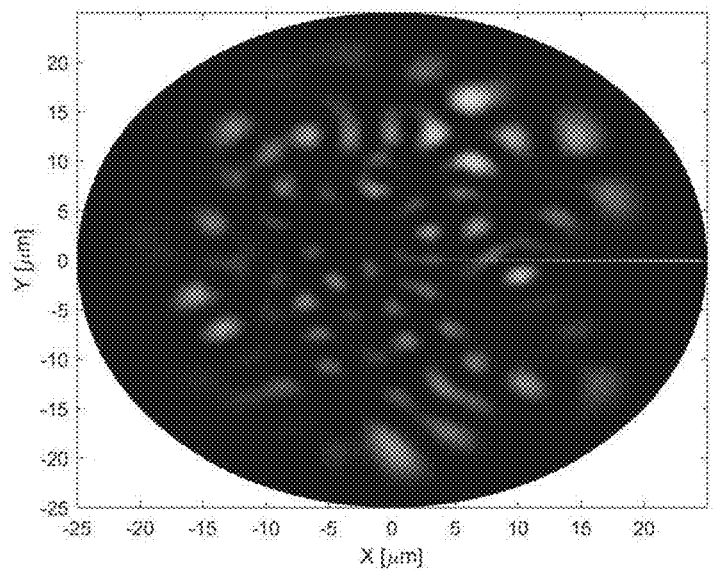
Figure 5I:
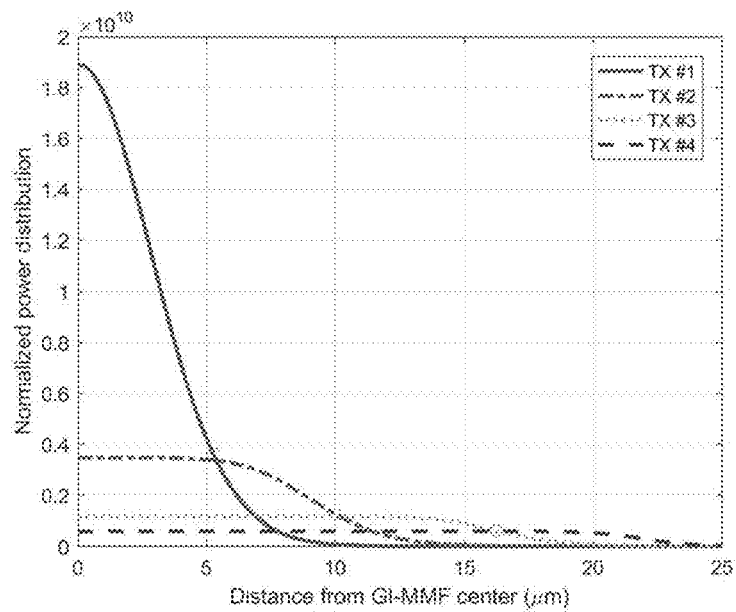

FIGS. 5a-ai schematically shows the normalized power distribution (mean and random realization) of the NFP at the fiber output of a 50 µm GI-MMF, excited by 4 tilted Gaussian beams at 850 nm whereas: FIG. 5a is transmitter (TX) #1 (0°, FWHM=11 µm, mean); FIG. 5b is TX #2 (2.6°, FWHM=16 µm, mean); FIG. 5c is TX #3 (4.9°, FWHM=20 µm, mean); FIG. 5d is TX #4 (6.8°, FWHM=20 µm, mean); FIG. 5e is TX #1 (0°, FWHM=11 µm, random realization); FIG. 5f is TX #2 (2.6°, FWHM=16 µm, random realization); FIG. 5g is TX #3 (4.9°, FWHM=20 µm, random realization); FIG. 5h is TX #4 (6.8°, FWHM=20 µm, random realization); and FIG. 5i shows all TXs combined (mean).

Moreover, as mentioned above and as seen in FIG. 5, the MSD's radiuses are chosen in the intersection of the mean normalized power distributions. The received channel matrices, i.e., their mean and standard deviation based upon 10000 random realizations, for 1310 nm and 850 nm are given by $$H_{1310} = \begin{bmatrix} 0.7921 & 0.3192 & 0.1326 & 0.0823 \\ 0.2004 & 0.4881 & 0.2884 & 0.1791 \\ 0.0075 & 0.1824 & 0.4559 & 0.3501 \\ 0.0000 & 0.0102 & 0.1231 & 0.3886 \end{bmatrix} \quad (48a)$$

$$H_{850} = \begin{bmatrix} 0.7773 & 0.3097 & 0.1030 & 0.0598 \\ 0.2146 & 0.5439 & 0.2635 & 0.1522 \\ 0.0081 & 0.1446 & 0.5168 & 0.3422 \\ 0.0000 & 0.0019 & 0.1166 & 0.4458 \end{bmatrix} \quad (48b)$$

$$H_{1310-std} = \begin{bmatrix} 0.0338 & 0.0897 & 0.0375 & 0.0220 \\ 0.0285 & 0.0708 & 0.0463 & 0.0286 \\ 0.0059 & 0.0496 & 0.0543 & 0.0361 \\ 0.0000 & 0.0039 & 0.0267 & 0.0492 \end{bmatrix} \quad (48c)$$

$$H_{850\text{-}std} = \begin{bmatrix} 0.1011 & 0.0857 & 0.0267 & 0.0145 \\ 0.0918 & 0.0736 & 0.0365 & 0.0214 \\ 0.0106 & 0.0395 & 0.0442 & 0.0289 \\ 0.0000 & 0.0007 & 0.0208 & 0.0387 \end{bmatrix} \quad (48d)$$

where $H_{1310}$ and $H_{850}$ denote the 1310 nm and 850 nm mean channel matrices, respectively. Furthermore, $H_{1310\text{-}std}$ and $H_{850\text{-}std}$, denote the 1310 nm and 850 nm standard-deviation channel matrices, respectively.

One can notice that the channel matrices are dominated by their mean values, while their standard-deviation is relatively small. The penalty for the channel matrices' variations can be taken into account by increasing the SNR gap r in respect to the channels' variation, thus reducing the outage probability. A different and complementary approach to deal with channel matrices instability is a fast tracking mechanism. The optimization computation time can be reduced by using a high speed dedicated hardware, or by using off-line computation for the various possible channel matrices, and applying real time selection.

Taking these facts into account, the channel matrices used for the following analysis of the total energy consumption per bit and the VCSEL driving current amplitude in are based on the ensemble of possible channel matrices.

In order to solve the power optimization problem summarized in (40a)-(40c), CVX, a package for specifying and solving convex problems was used.

Total Energy Consumption Per Bit

Figure 6A:
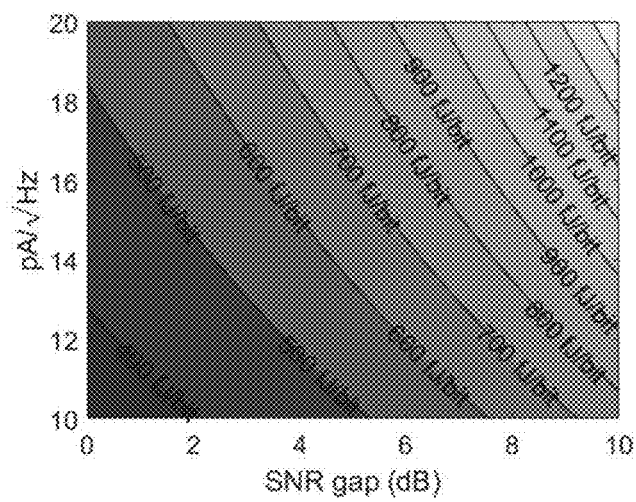
FIGS. 6a-6e schematically show a comparison of the fJ/bit ratio for different bit and power loading schemes using an 850 nm VCSEL array, according to an embodiment of the invention.
Figure 6B:
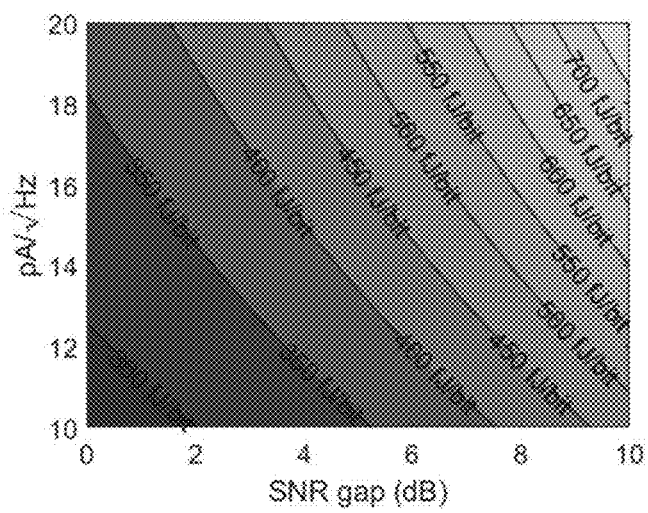
Figure 6C:
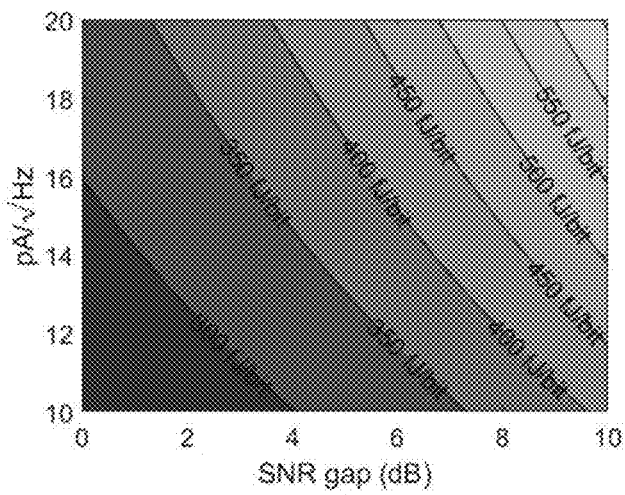
Figure 6D:
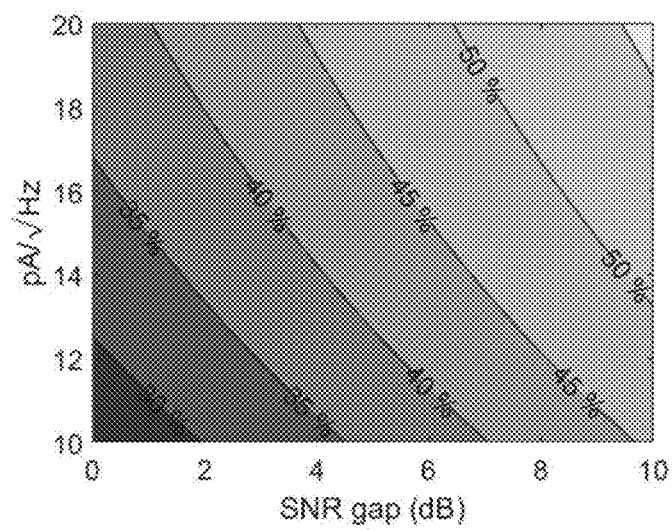
Figure 6E:
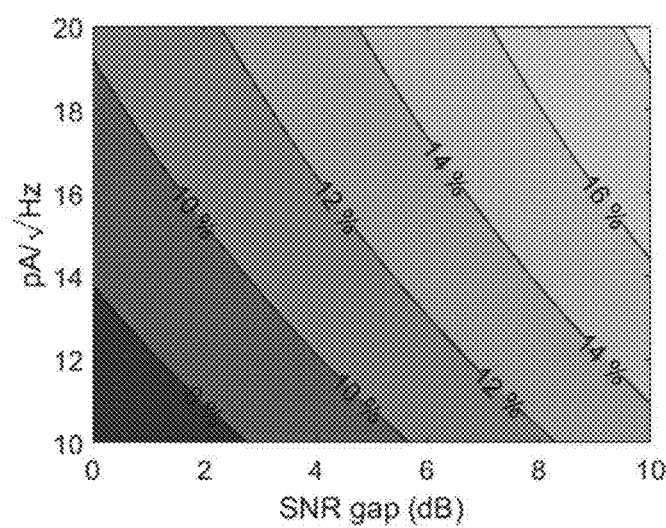
Figure 7A:
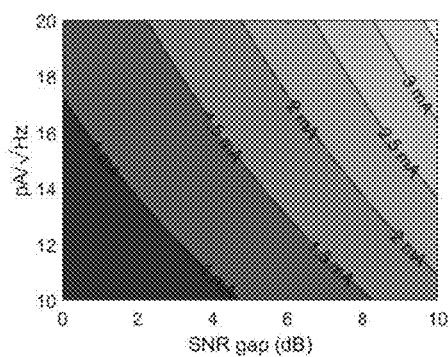
FIGS. 7a-7d schematically show the VCSEL driving current amplitude using the optimization method of the present invention according to an embodiment of the invention.
Figure 7B:
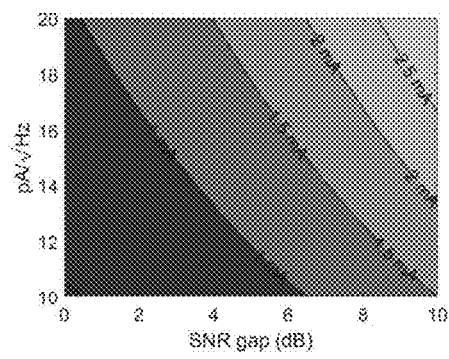
Figure 7C:
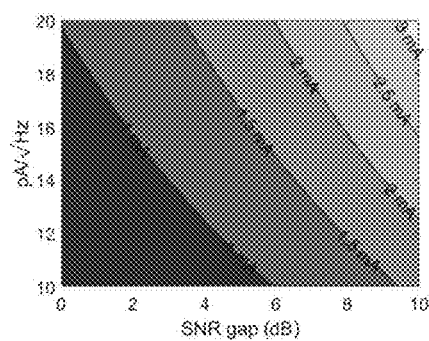
Figure 7D:
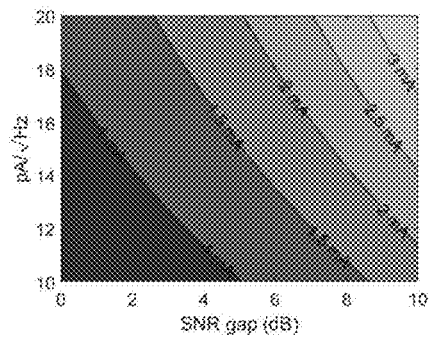

FIGS. 6a-6e schematically show the total energy consumption per bit of an 850 nm VCSEL array using the simulation parameters of FIGS. 4a-4b (Table I and II). FIGS. 6a-6e present a comparison of the fJ/bit ratio for different bit and power loading schemes using an 850 nm VCSEL array. In FIG. 6a, the fJ/bit ratio is calculated when using an equal bit loading and the same distance in all modulators. The common distance is chosen by the worst sub-channel for which the BER demand should be met. In FIG. 6b, the fJ/bit ratio is calculated using an equal bit loading scheme in all the transmitters with no constraint on equal distances. In FIG. 6c, the optimal fJ/bit ratio can be observed using the solution of problem (40a)-(40c) (Optimal electrical power scheme in fJ/bit). Finally, FIG. 6d and FIG. 6e present the electrical power saving of the optimal power scheme versus the two other (1. equal bit loading and equal worse case distance. 2. Equal bit loading with no constraint on equal distances) suggested schemes, in percentage.

It is quite vivid to notice a substantial electrical power save of 45-55% using the present invention optimization scheme compared to an equal bit and power loading scheme using an 850 nm VCSEL array with a required BER of $10^{-6}$, corresponding for $\Gamma=8.8$ dB, for a single 80 Gb/s GI-MMF link. The optimal solution also surpasses the equal bit loading scheme by 12-18% for the same required BER.

The results are even more dramatic for a 1310 nm VCSEL array, which can reach an electrical power save of 55-65% using the present invention optimization scheme compared to an equal bit and power loading scheme with a required BER of $10^{-6}$. And 18-26% electrical power save compared to an equal bit loading scheme for the same required BER.

VCSEL Driving Current Amplitude

The VCSEL driving current amplitude using the optimization scheme of the present invention for all 4 transmitters is shown in FIGS. 7a-7d.

FIGS. 7a-7d schematically show a 850 nm VCSEL driving current amplitude in mA, when using optimized electrical power with the simulation parameters of FIGS. 4a-4b (Table I and II): (a) TX #1; (b) TX #2; (c) TX #3; (d) TX #4.

It can be easily notice that the maximum driving current amplitude for a required BER of $10^{-6}$ is about 3.5 mA.

Figure 8A:
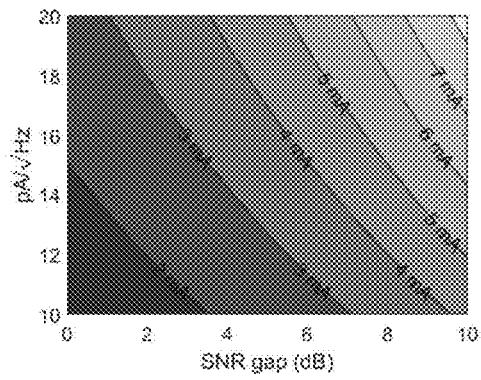
FIGS. 8a-8c schematically show a comparison between the largest driving current amplitude (peak current) required to drive the 850 nm VCSEL array using the present invention and three different bit and power loading schemes.
Figure 8B:
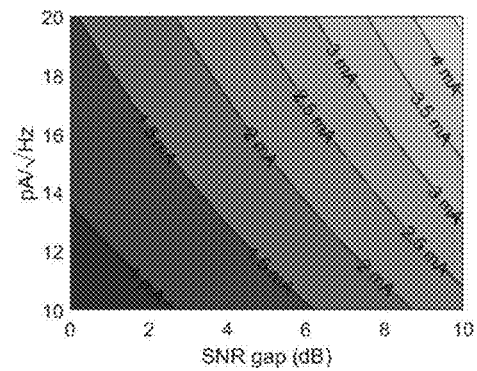
Figure 8C:
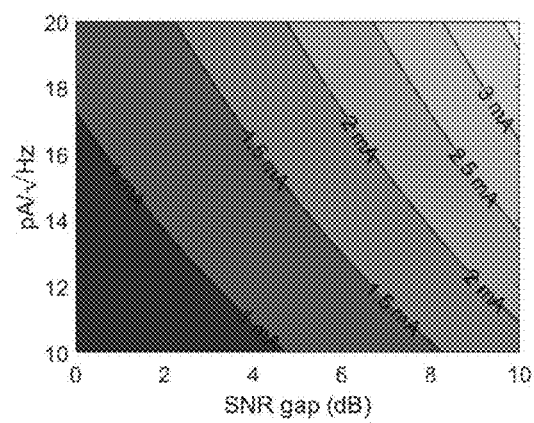

FIGS. 8a-8c schematically show a largest driving current amplitude transmitter in mA of an 850 nm VCSEL array using the simulation parameters of FIGS. 4a-4b (Table I and II). In FIG. 8a, Equal bit loading and equal worse case distance scheme in mA were used. In FIG. 8b, Equal bit loading scheme in mA was used; and in FIG. 8c, Optimal electrical power scheme in mA was used.

In FIG. 8, the largest driving current amplitude (peak current) required to drive the 850 nm VCSEL array using the present invention 3 different bit and power loading schemes mentioned earlier are compared. It is interesting to notice that the driving peak current saving ratio is almost the same for the entire noise standard-deviation per channel and SNR gap region. It reaches about 56% between our suggested optimization scheme compared to an equal bit and power loading scheme and about 21% compared to a standard equal bit loading scheme.

A smaller driving peak current may allow the design of a lower cost and lower power VCSEL driver. Moreover, the reduction of the electrical power reduces the temperature of the VCSEL array, thus further increases the linear range of the L-I curve.

In the present invention, an energy efficient convex optimization problem is formulated to a mode-group-division-multiplexing MIMO scheme, which includes a VCSEL array with multi-segment concentric photo-detector. This enables to reduce the electrical power consumption, driving current, and temperature of the optical components. The system and method of the present invention reaches an electrical power save of 45-55% using our suggested optimization scheme compared to an equal bit and power loading scheme using an 850 nm VCSEL array with a required bit error rate of $10^{-6}$ for a single 80 Gb/s GI-MMF.

The invention claimed is:

1. A system for optimizing power allocation for each optical transmitter in an optical transmission system; said system comprises:
    a) at least two intensity modulated optical transmitters, each of which is controlled by a modulator;
    b) an optical channel that can be spatially multiplexed by a multiplexer; and
    c) at least two optical detectors, for detecting transmitted modulated signals,
    wherein each of said modulators are adapted to modulate said at least two intensity modulated optical transmitters such that electrical power consumption of said optical transmitters is minimized by a modulation scheme of said modulators, that uses energy efficient convex optimization to multiplex transmitted optical signals, by said multiplexer in a multiple-input-multiple-output (MIMO) scheme; and wherein each of said modulators are adapted to modulate said at least two intensity modulated optical transmitters, such that the capacity of said optical transmission system is maximized by a modulation scheme of said modulators, that uses energy efficient convex optimization to multiplex the transmitted optical signals, by said multiplexer in a multiple-input-multiple-output (MIMO) scheme.

2. A system according to claim 1, wherein the output architecture of the (MIMO) scheme is based upon Singular Value Decomposition (SVD).

3. A system according to claim 1, wherein the output architecture of the (MIMO) scheme is based upon Vertical Bell Labs Layered Architecture Space Time (V-BLAST).

4. A system according to claim 1, wherein the optical channel is a glass or plastic graded-index multimode fiber.

5. A system according to claim 1, wherein the optical channel is a glass or plastic step-index multimode fiber.

6. A system according to claim 1, wherein the optical channel is a glass or plastic multicore fiber.

7. A system according to claim 1, wherein the power allocation maximizes the capacity of the optical transmission system, instead of minimizing the electrical power consumption of the optical transmitters.

8. A system according to claim 1, wherein the optical transmitters are directly modulated lasers.

9. A system according to claim 1, wherein the optical transmitters are Vertical Cavity Surface Emitting Lasers (VCSELs).

10. A system according to claim 1, wherein the optical transmitters are light emitting diodes (LEDs).

11. A system according to claim 1, wherein the optical transmitters are resonant-cavity LEDs (RC-LEDs), or micro-LEDs.

12. A system according to claim 1, wherein the optical detectors are avalanche-photodiodes, P-I-N photodiodes or multi-segment detectors.

13. A system according to claim 1, wherein the optical transmitters are LEDs or laser, and the optical channel is a plastic multicore fiber and the optical detector is silicon photodiode.

14. A system according to claim 1, wherein the optical transmitters are LEDs or laser, and the optical channel is a plastic graded index fiber and the optical detector is silicon photodiode.

15. A method for optimizing power allocation for each optical transmitter in an optical transmission system which comprises at least two intensity modulated optical transmitters; an optical channel that can be spatially multiplexed by multiplexer in a multiple-input-multiple-output (MIMO) scheme, and at least two direct detection optical detectors; said method comprises the steps of:
  a) keeping the intensity modulated current of said at least two intensity modulated optical transmitters above the current consumed by said optical transmitters for ensuring lasing by adding a DC offset to a modulated signal;
  b) allocating each bit stream for a number of bit/sec/Hz, according to required transmission efficiency of each channel—which is derived from solution of the convex optimization problem;
  c) keeping the Bit Error Rate (BER) below a predetermined threshold of a target BER, to guarantee a required quality of service by using Signal to Noise Ratio (SNR) gap concept;
  thereby using energy efficient convex optimization for determining optimal power allocation for each transmitter in said optical transmission system.

16. A method according to claim 15, wherein for multi-segment concentric photo detector (MSD), intersection points of a normalized power distributions are chosen as radiuses of the MSD.

17. A method according to claim 15, wherein the output architecture of the (MIMO) scheme is based upon Singular Value Decomposition (SVD).

18. A method according to claim 15, wherein the output architecture of the (MIMO) scheme is based upon Vertical Bell Labs Layered Architecture Space Time (V-BLAST).

19. A method according to claim 15, wherein the optical channel is a glass or plastic graded-index multimode fiber.

20. A method according to claim 15, wherein the optical channel is a glass or plastic step-index multimode fiber.

21. A method according to claim 15, wherein the optical channel is a glass or plastic multicore fiber.

22. A method according to claim 15, wherein power allocation maximizes capacity of the optical transmission system, instead of minimizing the electrical power consumption of the optical transmitters.

23. A method according to claim 15, wherein the optical transmitters are directly modulated lasers.

24. A method according to claim 15, wherein the optical transmitters are Vertical Cavity Surface Emitting Lasers (VCSEL).

25. A method according to claim 15, wherein the optical transmitters are light emitting diodes (LEDs).

26. A method according to claim 15, wherein the optical transmitters are resonant-cavity LEDs (RC-LEDs), or micro-LEDs.

27. A method according to claim 15, wherein the optical detectors are avalanche-photodiodes, P-I-N photodiodes or multi-segment detectors.

28. A method according to claim 15, wherein the optical transmitters are LEDs or laser, the channel is a plastic multicore fiber and the optical detector is silicon photodiode.

* * * * *